(12) United States Patent
Livingston

(10) Patent No.: US 7,835,066 B2
(45) Date of Patent: Nov. 16, 2010

(54) SYSTEMS AND METHODS FOR GENERATING ELECTROMAGNETIC RADIATION

(75) Inventor: Peter M. Livingston, Palos Verdes Estates, CA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 0 days.

(21) Appl. No.: 12/341,344

(22) Filed: Dec. 22, 2008

(65) Prior Publication Data

US 2010/0157414 A1 Jun. 24, 2010

(51) Int. Cl.
*G02F 1/365* (2006.01)
(52) U.S. Cl. .................... 359/332; 359/346; 385/28; 385/35
(58) Field of Classification Search ............. 359/326, 359/332, 346; 385/15, 27, 28, 32, 35, 43
See application file for complete search history.

(56) References Cited

U.S. PATENT DOCUMENTS

| | | | | |
|---|---|---|---|---|
| 5,652,556 | A * | 7/1997 | Flory et al. ............. 333/219.1 |
| 5,742,633 | A * | 4/1998 | Stone et al. .................. 372/92 |
| 6,488,861 | B2 * | 12/2002 | Iltchenko et al. ............. 216/24 |
| 7,352,933 | B2 * | 4/2008 | Fan et al. ..................... 385/43 |
| 7,415,178 | B2 * | 8/2008 | Montgomery et al. ......... 385/39 |
| 7,535,634 | B1 * | 5/2009 | Savchenkov et al. ....... 359/346 |
| 7,702,202 | B2 * | 4/2010 | Koch et al. ................... 385/50 |
| 7,729,047 | B1 * | 6/2010 | Savchenkov et al. ....... 359/346 |
| 2002/0044739 | A1 * | 4/2002 | Vahala et al. ................ 385/30 |
| 2002/0081055 | A1 * | 6/2002 | Painter et al. ................. 385/2 |
| 2004/0196465 | A1 * | 10/2004 | Arnold et al. ............... 356/432 |
| 2007/0160093 | A1 | 7/2007 | Nishizawa et al. |

FOREIGN PATENT DOCUMENTS

WO  WO 01/71401 A1  9/2001

OTHER PUBLICATIONS

Tanabe et al: "*Frequency-Tunable High-Power Terahertz Wave Generation from GaP*"; Journal of Applied Physics, vol. 93, No. 8, Apr. 15, 2003, p. 4610-4615.

* cited by examiner

*Primary Examiner*—Daniel Petkovsek
(74) *Attorney, Agent, or Firm*—Tarolli, Sundheim, Covell & Tummino, LLP

(57) ABSTRACT

Systems and methods for generating electromagnetic waves are provided. In one embodiment, a system for generating electromagnetic waves is provided. The system comprises a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave.

10 Claims, 4 Drawing Sheets

SYSTEMS AND METHODS FOR GENERATING ELECTROMAGNETIC RADIATION

TECHNICAL FIELD

The present invention relates to electromagnetic systems, more particularly to systems and methods for generating electromagnetic radiation.

BACKGROUND OF THE INVENTION

Terahertz radiation refers to electromagnetic waves sent at the terahertz range between 300 gigahertz ($3\times10^{11}$ Hz) and 3 terahertz ($3\times10^{12}$ Hz), corresponding to the submillimeter wavelength range between 1 millimeter, in the high-frequency edge of the microwave band, and 100 micrometers, long-wavelength edge of far-infrared light. Terahertz radiation is non-ionizing submillimeter microwave radiation and shares with microwaves the capability to penetrate a wide variety of non-conducting materials. For example, terahertz radiation can pass through clothing, paper, cardboard, wood, masonry, plastic, ceramics, fog and clouds, but not metal or water. Terahertz radiation is emitted as black body radiation from an object with a temperature approximately equal to or greater than ten Kelvin. Possible sources of employable terahertz radiation include a gyrotron, backward wave oscillator, quantum cascade laser, the free electron laser, and synchrotron light sources.

SUMMARY OF THE INVENTION

In accordance with one aspect of the present invention, a system for generating electromagnetic waves is provided. The system comprises a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave.

In accordance with another aspect of the present invention, a system for generating electromagnetic waves is provided. The system comprises means for providing a first wave, means for providing a second wave, means for generating a resulting electromagnetic wave having a difference frequency caused by whispering gallery modes and means for outputting the resulting electromagnetic wave.

In yet another aspect of the invention, a method is provided for generating electromagnetic waves. The method comprises fabricating a dielectric column comprising a spherical portion and at least one cylindrical portion. The method further comprises selecting a first wave and a second wave based on the ability of the first wave and second wave to generate a difference frequency in the structure having a suitable nonlinear polarizability. The method further comprises providing the first wave into the spherical portion and providing the second wave into the spherical portion. The method further comprises generating a resulting electromagnetic wave having the difference frequency caused by whispering gallery modes of the spherical portion and out coupling the resulting electromagnetic wave from the at least one cylindrical portions.

DETAILED DESCRIPTION OF INVENTION

Figure 1:
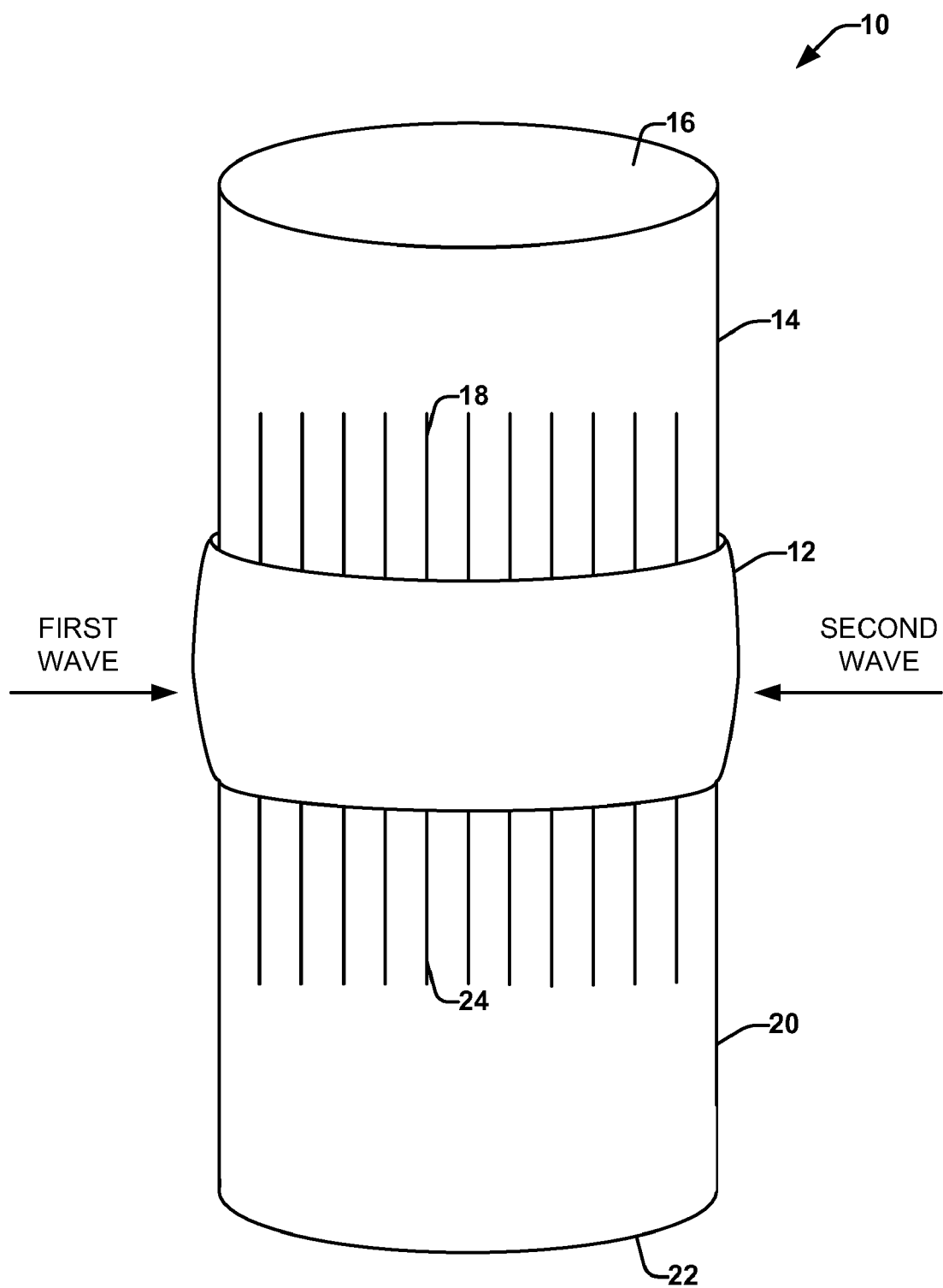
FIG. 1 illustrates a front view of a dielectric column in accordance with an aspect of the present invention.

Systems and methods are provided that employ Whispering Gallery Modes (WGMs) to generate a difference signal from a source and a pump signal. The source and pump signal are automatically phase matched due to the physics associated with WGMs. Whispering gallery modes are named for a phenomenon at London's St. Paul's Cathedral in a circular walkway under the church dome. Individuals on one side of the walkway can clearly hear the whispered voices of individuals on the opposing side of the walkway. This is not done by attempting to talk across the void but rather by whispering towards the wall. The acoustics allow sound to travel the circumference of the circular walkway. The same physical phenomenon can occur in smaller objects. Whispering gallery modes occur at particular resonant wavelengths dependent on a given objects size. At these wavelengths, the wave undergoes total internal reflection at the objects surface and becomes trapped within the object. The wave is concentrated near the circumference of the object and can be assigned a mode number and a mode order. The mode number is indicative of the number of wavelengths around the circumference of the object, and the mode order, which is the number of maxima in the radial dependence of the electromagnetic field within the object.

For physical insight, suppose a ray with wavenumber nk inside a spherical portion intersecting the surface at an angle $\theta$ relative to the normal, then the ray angular momentum is $$q = l + \frac{1}{2} = nka\sin\theta = nx\sin\theta \qquad \text{Eq. 1}$$

It is clear that the parameter x lies in the range $1/n < x < 1$ and it will turn out that we are interested only in modes that bounce many times through total internal reflection. The reason is that it is only these large angular momentum states are capable of being fashioned to satisfy momentum balance required for phase matching.

Asymptotic analysis of the Mie scattering formulas yield's an expression for x in terms of an expansion in q. It also involves the roots, $\alpha_m$ of the Airy function, $Ai(-z)$, and can be expressed for either TE or TM modes.

$$nx_{l,m} = q + \frac{\alpha_m q^{\frac{1}{3}}}{2^{\frac{1}{3}}} - \frac{P}{(n^2-1)^{\frac{1}{2}}} + \qquad \text{Eq. 2}$$

-continued $$\left(\frac{3}{10\cdot 2^{\frac{2}{3}}}\right)\alpha_m^2 q^{-\frac{1}{3}} - \frac{P\left(n^2 - \frac{2P^2}{3}\right)}{2^{\frac{1}{3}}(n^2-1)^{\frac{3}{2}}}\alpha_m q^{-\frac{2}{3}} + O\left(\frac{1}{q}\right)$$

$$P = \begin{vmatrix} n & \text{TE mode} \\ 1/n & \text{TM mode} \end{vmatrix}$$

$$q = l + \frac{1}{2}$$

For reference, the first few Airy roots are $\alpha_m$=2.338, 4.088, 5.521, 6.787, 7.944, 9.023, 10.04, 11.009, 11.936, 12.289, 13.692, 14.528, 15.341, 16.133, and 16.906 for m=1 . . . 15.

Consider now the phase matching problem for difference frequency generation in the sphere. Clearly the energy condition is trivial.

$$\omega_p = \omega_s + \omega_i \qquad \text{Eq. 3}$$

The subscripts p, s and i stand for 'pump,' 'signal,' and 'idler' respectively corresponding to a first wave a second wave and resulting electromagnetic wave, respectively. On the other hand, the momentum matching condition is a little harder to realize.

$$\Delta k = \frac{2\pi}{\lambda_p} n_p - \frac{2\pi}{\lambda_s} n_s - \frac{2\pi}{\lambda_i} n_i \qquad \text{Eq. 4}$$

$$\Delta k a = n_p x(p)_{l,m} - n_s x(s)_{l',m} - n_i x(i)_{l'',m}$$

The actual sphere radius is inconsequential for true momentum matching because $\Delta k=0$. The energy equation says that a pump photon must disappear and be replaced by one signal and one idler photon, and the momentum balance equation must equal zero if gain at the idler frequency is to be realized. It can be assumed for high angular momentum states that the 'magnetic' index number m equals the angular momentum index number l for the pump and signal. With that constraint, differing angular momentum states can be excited with the pump and signal because the pump and signal can be injected into the sphere at slightly differing angles. Moreover, by adjustment of the mean incidence angle (such as with a coupling prism), a specific high order angular momentum state can be excited.

FIG. 1 illustrates a front view of a portion of an electromagnetic radiation generation system in accordance with an aspect of the present invention. The electromagnetic radiation generation system employs whispering gallery modes to generate a difference frequency from a source and a pump signal. The electromagnetic radiation generation system comprises a dielectric column 10 comprising a spherical portion 12 and at least one cylindrical portion 14 (and 20), wherein the spherical portion 12 receives a FIRST WAVE and a SECOND WAVE. The FIRST WAVE and SECOND WAVE are selected to generate a resulting electromagnetic wave along the interior of the cylindrical portion 14 (and 20) having a difference frequency caused by whispering gallery modes of the spherical portion 12. The at least one cylindrical portion 14 (and 20) has at least one output 18 (and 24) for outputting the resulting electromagnetic waves.

The spherical portion 12 is fabricated from a non-linear material (e.g., gallium phosphide, gallium arsenide) or another non-centrosymmetric crystal material with good chi-2 characteristics. Non-linear materials generally require phase matching, (either through making use of the crystal birefringence or non-collinear injection of pump and signal photons), however because the spherical portion 12 employs whispering gallery modes phase matching is an automatic condition of resonance, for the FIRST and SECOND waves. The FIRST WAVE and the SECOND wave are inserted into the circumference of the spherical portion 12. The angle of insertion for the FIRST WAVE and/or the SECOND WAVE can be adjustable. The FIRST WAVE and SECOND WAVE are phase matched as a function of the whispering gallery modes of the sphere as determined by the dimensions of the spherical portion.

The spherical portion may have a diameter greater than that of the cylindrical portions 14 (and 20). An appropriate diameter difference can be determined based on the spherical and cylindrical Bessel functions describing the resulting electromagnetic wave. The FIRST WAVE and SECOND WAVE interact with the interior of the spherical portion 12 with a high periodicity, however, the resulting electromagnetic wave interacts with the interior of the cylindrical portion 14 (and 20) with an average radius of less than half the radius of the spherical portion 12. Therefore, an appropriate radius for the spherical portion 12 can be estimated, such that the circumference of the mean radius for the resulting electromagnetic wave is approximately equal to the product of the angular momentum mode number and the wavelength of the resulting electromagnetic wave, divided by the refractive index of the dielectric column at that wavelength.

The interaction of the FIRST WAVE and SECOND WAVE generates a difference frequency, thereby creating the resulting electromagnetic wave with a larger wavelength than either the FIRST WAVE or SECOND WAVE. The resulting electromagnetic wave is present in both the spherical portion 12 and the cylindrical portions 14 and 20. End plates 16 and 22 corresponding to cylindrical portions 14 and 20 respectively act as a conducting plane located a certain distance from the mid point of the spherical portion 12, such that the reflected wave reinforces the original wave.

The resulting electromagnetic wave is evanescent, and therefore does not radiate outward from the cylinder. Consequently, the cylindrical portions 14 and 20 are modified to out-couple the resulting electromagnetic wave. The vertical lines represented by 18 and 24 are gratings. The gratings may be etched, scribed or deposited on the cylindrical portions 14 and 20. The gratings associated with 18 and 24 act as antennas by interacting with the interior circulating electromagnetic wave and consequently out coupling the resulting electromagnetic wave into space around the dielectric column 10. In one aspect of the present invention the resulting electromagnetic wave is a terahertz wave.

Figure 2:
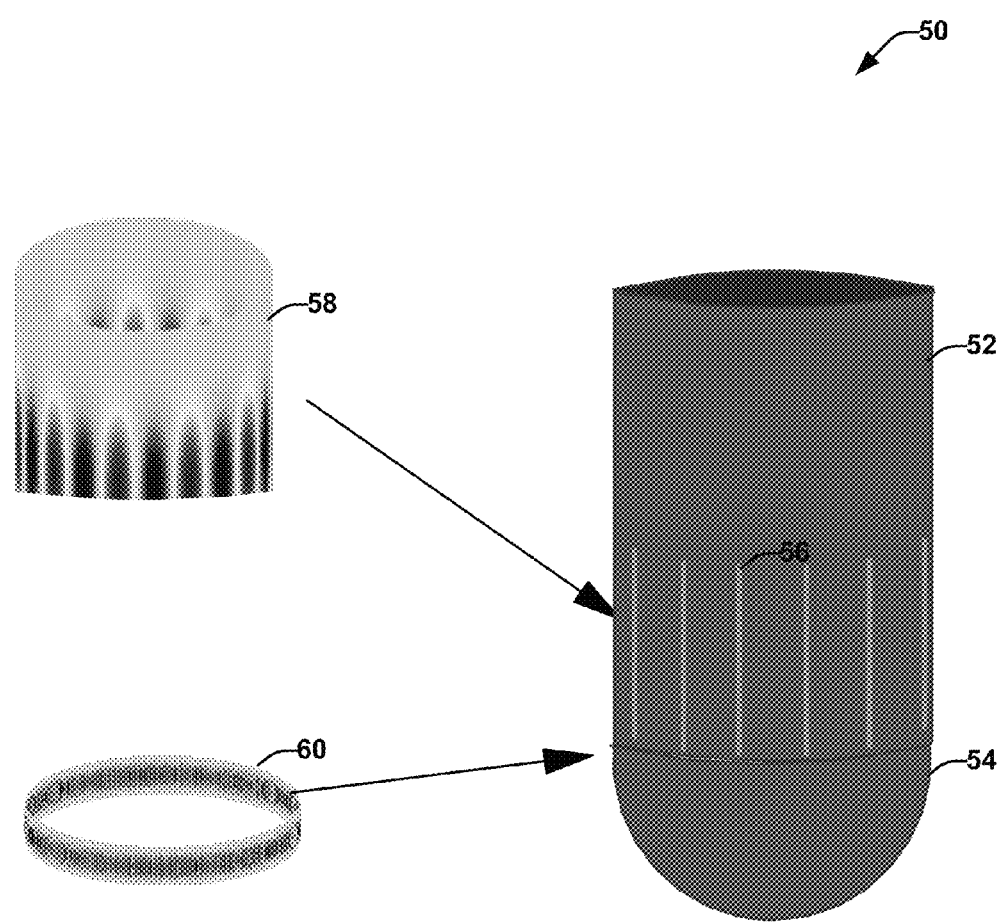
FIG. 2 illustrates an exploded view of a portion of a dielectric column in accordance with another aspect of the present invention.

FIG. 2 illustrates an exploded view of a portion of a dielectric column in accordance with another aspect of the present invention. The dielectric column 50, as shown in FIG. 2 has one cylindrical portion 52. However it will be appreciated by one skilled in the art that the dielectric column 50 may have a plurality of cylindrical portions.

The spherical band 60 illustrates the relative periodicity of the FIRST WAVE AND SECOND WAVE in the interior of the spherical portion 54. The FIRST WAVE and SECOND WAVE are confined to the circumference of the spherical portion 54. Because the FIRST WAVE and the SECOND WAVE have a much shorter wavelength (e.g., on the order of microns), the FIRST WAVE and SECOND WAVE have a periodicity in the interior of the spherical portion that is greater than periodicity of the resultant wave shown in the cylindrical band 58. Truncating the spherical portion does not affect spherical band 60 occupied by the FIRST WAVE and the SECOND WAVE. It will be appreciated by one skilled in the art that the resultant wave is also present in the spherical potion 54 of the dielectric column 50, but is not shown in the spherical band 60 for purposes of clarity.

The cylindrical band 58 illustrates the relative periodicity of the resulting electromagnetic wave in the interior of the cylindrical portion 52. The resulting electromagnetic wave is formed in the cylindrical portion 52 as a consequence of difference frequency generation. Difference frequency generation is a property of nonlinear crystal materials that exhibit chi-2 properties. In such nonlinear crystal materials difference frequency generation can occur where a first wave and a second wave generate a resulting electromagnetic wave with the difference frequency of the first and second wave. Difference frequency generation with a first wave and second wave of substantially similar frequencies can lead to a resulting electromagnetic wave with a long wavelength, such as terahertz waves. The vertical scoring 56 disposed on the cylindrical portion 52 can be gratings. Each grating interacts with the whispering gallery modes of the transverse resulting electromagnetic wave and causes the resulting electromagnetic wave to be radiated outside of the dielectric column 50.

Figure 3:
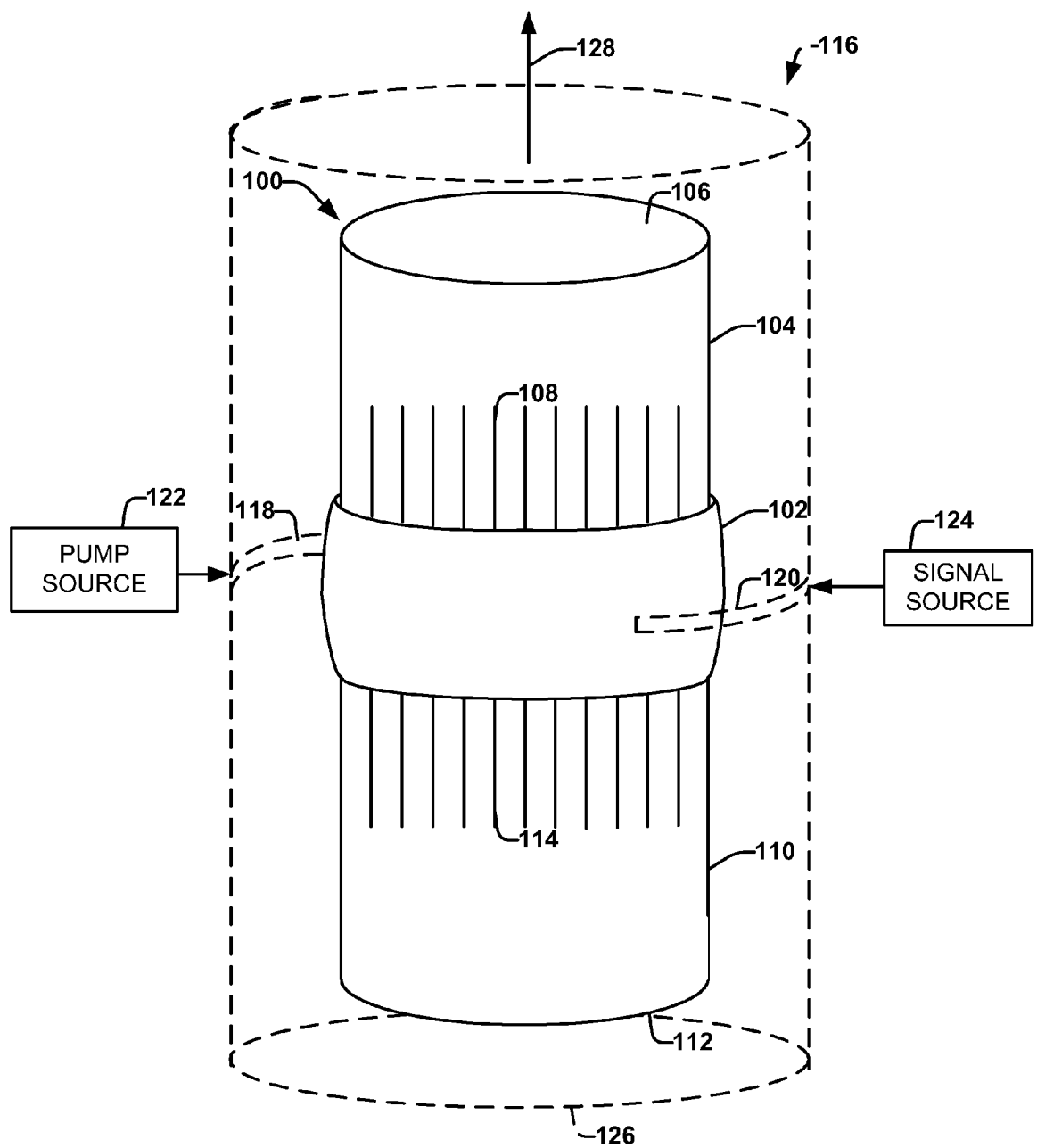
FIG. 3 illustrates a front view of a dielectric column with a phantom view of a surrounding waveguide in accordance with another aspect of the present invention.

FIG. 3 illustrates an example of an electromagnetic radiation generation system employing a waveguide 116 in accordance with an aspect of the present invention. In FIG. 3, it will be appreciated that reference numbers 102-114 generally correspond to elements 12-24 of FIG. 1 increased by adding 90. For the sake of brevity, such common features may be described briefly or be omitted altogether in the description of FIG. 3. Additional information about such elements is available by referring back to such corresponding elements in the description of FIG. 1.

The waveguide 116 is shown in phantom view such that a dielectric column 100 within the waveguide 116 is also illustrated. The waveguide 116 is a metal cylinder with two slots 118 and 120. Slot 118 admits a first wave into the waveguide 116 to be injected into a spherical potion 102 from a pump source 122. Slot 120 admits a second wave into the waveguide 116 to be injected into a spherical potion 102 from a signal source 124. The slots 118 and 120 need only be large enough to admit the first wave and the second wave. The first wave and second wave may be brought into evanescent contact with the spherical portion 102 by means of fibers. The gratings associated with 108 and 114 out couple the resulting electromagnetic wave from the cylindrical portions 104 and 110 respectively. Therefore, the resulting electromagnetic wave is out coupled as an electromagnetic field in the mid-space between the dielectric column 100 and the waveguide 116. A support structure for the dielectric column 100 disposed within the waveguide 116 has been omitted for clarity. The waveguide can have a conductive reflecting plate 126 on one end to direct the electromagnetic radiation out of the opposite end of the waveguide 116 in a single direction as indicated by arrow 128.

Figure 4:
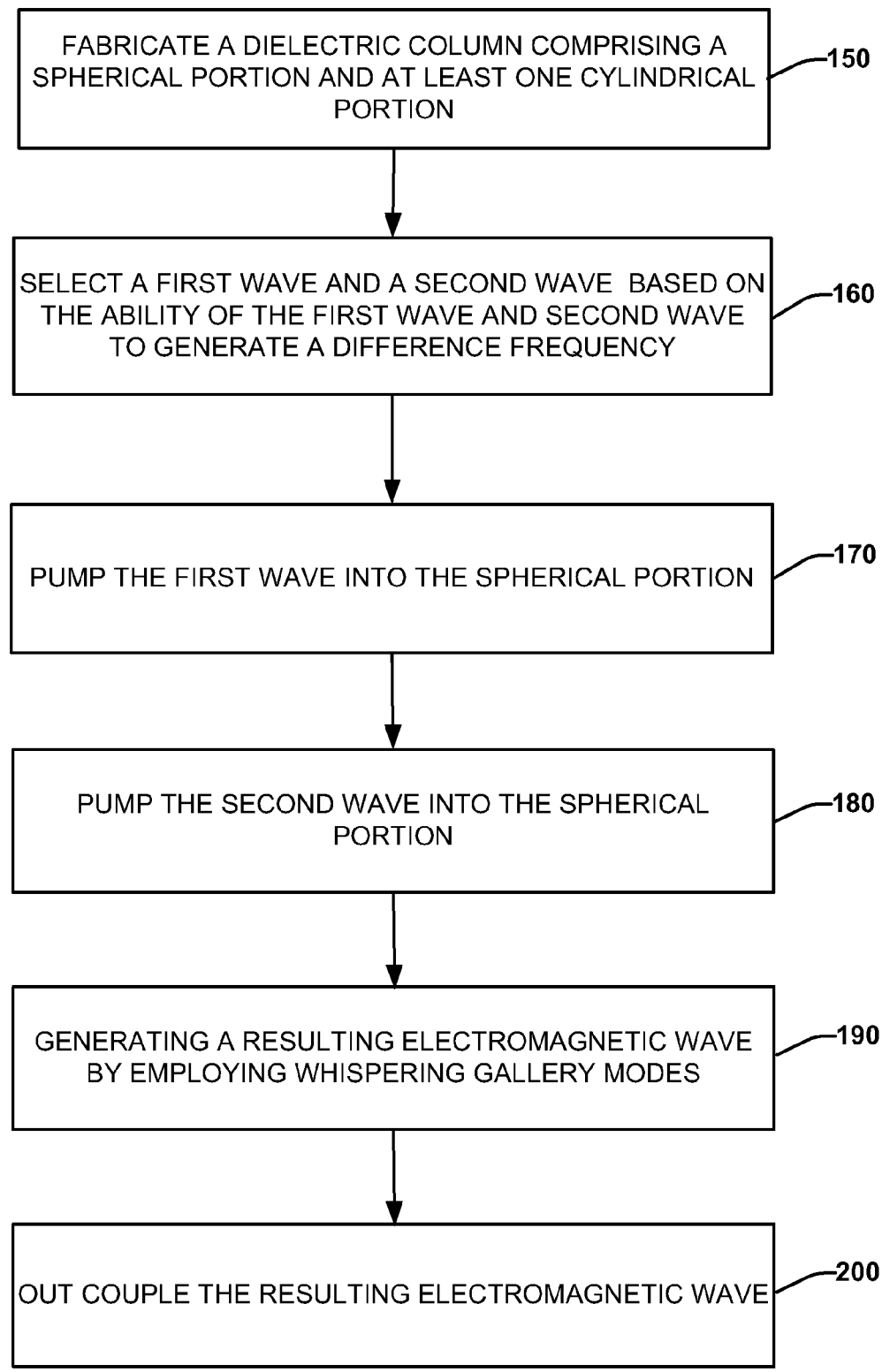
FIG. 4 illustrates a methodology for generating electromagnetic waves in accordance with an aspect of the present invention.

In view of the foregoing structural and functional features described above, a methodology in accordance with various aspects of the prevention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates a methodology for generating electromagnetic waves in accordance with an aspect of the present invention. The methodology begins at 150 where a dielectric column comprising a spherical portion and at least one cylindrical portion is fabricated. At 160 a first wave and a second wave are selected based on the ability of the first wave and second wave to generate a difference frequency, particularly a difference frequency of long wavelength such as terahertz waves. At 170, the first wave is pumped into the spherical portion. At 180, the second wave is pumped into the spherical portion. At 190, a resulting electromagnetic wave is generated in the at least one cylindrical portion by employing whispering gallery modes of the spherical portion. At 200, the resulting electromagnetic wave is out coupled from the at least one cylindrical portion.

It is to be appreciated that the methodology could include evanescently coupling at least the first wave and the second wave to the dielectric column. Additionally, the methodology can include adjusting the angle for inserting the first wave and/or the angle for inserting the second wave into the spherical portion.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for generating electromagnetic waves comprising:
    a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave, wherein the spherical portion is constructed of a nonlinear material.

2. The system of claim 1, wherein the first source and the second source employ a fiber evanescently coupled between respective source and the dielectric column by traversing a slot in a waveguide that substantially surrounds the dielectric column.

3. The system of claim of 1, wherein the at least one output is a grating.

4. The system of claim 3, wherein the grating is one of etched, scribed and deposited on the at least one cylindrical portion.

5. The system of claim 1, wherein the spherical portion of the dielectric column has a greater diameter than the at least one cylindrical portion.

6. The system of claim 1, wherein the whispering gallery modes provide automatic phase matching of the first wave and the second wave.

7. The system of claim 1, wherein the resulting electromagnetic wave is a terahertz wave.

8. A system for generating electromagnetic waves comprising:
    a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave, wherein the at least one cylindrical portion has an end cap located a distance from the spherical portion such that a reflected resulting electromagnetic wave from the end cap is reflected to reinforce the resulting electromagnetic wave.

9. A system for generating electromagnetic waves comprising:

a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave; and a waveguide substantially surrounding the dielectric column and receiving and transmitting the resulting electromagnetic wave, the waveguide having a conductive reflecting plate on one end to direct the electromagnetic radiation out of an opposite end of the waveguide in a single direction.

10. A system for generating electromagnetic waves comprising:

a dielectric column comprising a spherical portion and at least one cylindrical portion, wherein the spherical portion receives a first wave from a first source and a second wave from a second source and generates a resulting electromagnetic wave along the interior of the cylindrical portion having a difference frequency caused by whispering gallery modes of the spherical portion, and the at least one cylindrical portion having at least one output for outputting the resulting electromagnetic wave, wherein the insertion angle of the first wave and second wave is adjustable.

* * * * *